(12) United States Patent
Chen et al.

(10) Patent No.: US 9,204,258 B2
(45) Date of Patent: Dec. 1, 2015

(54) DEVICE AND METHOD FOR DISABLING COMMUNICATION AND/OR OTHER APPLICATION FUNCTIONS ON A MOBILE COMMUNICATION DEVICE

(71) Applicants: Theodore C. Chen, Los Altos, CA (US); Michael P. Demele, Los Altos, CA (US)

(72) Inventors: Theodore C. Chen, Los Altos, CA (US); Michael P. Demele, Los Altos, CA (US)

( * ) Notice: Subject to any disclaimer, the term of this patent is extended or adjusted under 35 U.S.C. 154(b) by 0 days.

(21) Appl. No.: 14/166,379

(22) Filed: Jan. 28, 2014

(65) Prior Publication Data

US 2014/0342717 A1    Nov. 20, 2014

Related U.S. Application Data

(60) Provisional application No. 61/824,957, filed on May 17, 2013.

(51) Int. Cl.
| | |
|---|---|
| *H04M 1/00* | (2006.01) |
| *H04W 4/02* | (2009.01) |
| *H04W 4/04* | (2009.01) |

(52) U.S. Cl.
CPC .............. *H04W 4/027* (2013.01); *H04W 4/046* (2013.01)

(58) Field of Classification Search
CPC .. H04M 1/72525; H04M 1/677; H04W 8/245
USPC ......... 455/418, 420, 565, 569.2, 456.4, 575.9
See application file for complete search history.

(56) References Cited

U.S. PATENT DOCUMENTS

| | | | |
|---|---|---|---|
| 8,295,854 B2 | 10/2012 | Osann, Jr. | |
| 8,384,555 B2 | 2/2013 | Rosen | |
| 8,543,135 B2 | 9/2013 | Goyal | |
| 8,706,143 B1 | 4/2014 | Elias | |
| 2008/0077865 A1 | 3/2008 | Hiles et al. | |
| 2011/0009107 A1 | 1/2011 | Guba et al. | |
| 2011/0171943 A1 | 7/2011 | Raviv | |
| 2011/0224901 A1* | 9/2011 | Aben et al. ..................... 701/208 |

(Continued)

FOREIGN PATENT DOCUMENTS

WO    WO 2004082248 A1 *    9/2004

OTHER PUBLICATIONS

"T-Mobile debuts teen driving nanny," Jan. 19, 2011, Handsfreeinfo.com, URL: http://handsfreeinfo.com/t-mobile-debuts-teen-driving-nanny/, 2 pages.

(Continued)

*Primary Examiner* — Chuck Huynh
(74) *Attorney, Agent, or Firm* — James W. Rose

(57) ABSTRACT

An application, embedded in a computer readable medium, that is configured to disable certain communication and/or other application functions on a mobile communication device. The application is configured to (i) receive one or more sample signals, which are indicative of ambient motion of the mobile communication device in the vehicle, from an accelerometer (ii) ascertain when the mobile communication device is in an undesirable motion state from the patterns of ambient motion, and (iii) disable one or more communication and/or other application functions when the mobile communication device is in the undesirable motion state. By using the accelerometer to generate the one or more sample signals, patterns of motion of the mobile communication device relative to the vehicle can be ascertained. When the motion patterns indicate that the vehicle is in motion, then the one or more communication and/or other application functions are disabled.

29 Claims, 7 Drawing Sheets

(56) References Cited

U.S. PATENT DOCUMENTS

2012/0053805 A1* 3/2012 Dantu ............................ 701/70
2012/0071151 A1    3/2012 Abramson et al.
2012/0252484 A1   10/2012 Andrews
2012/0289217 A1* 11/2012 Riemer et al. ................ 455/418

OTHER PUBLICATIONS

"What is Sprint Drive First?," Drivefirst.Sprint.com, URL: https://sdf.support.safely.com/entries/21077541-What-is-Sprint-Drive-First-, Oct. 25, 2011, 1 page.
"Welcome to Sprint Drive First," Drivefirst.Sprint.com, URL: https://drivefirst.sprint.com/welcome.htm, Oct. 25, 2011, 2 pages.
"Protect employee drivers. Minimize business risk.," AgeisMobility.com, URL: http://www.aegismobility.com/distracted-driving/fleetsafer-products, Jun. 2012, 3 pages.
"CellControl for Families," CellControl.com, URL: http://www.cellcontrol.com/stop-texting-while-driving-for-your-family/, Nov. 10, 2011, 4 pages.
"How it Works, CellControl," CellControl.com, URL: http://www.cellcontrol.com/stop-texting-while-driving-how-it-works/, Nov. 10, 2011, 1 page.
"TXT ME L8R," URL: http://www.txtmel8r.com/, May 15, 2012, 2 pages.
"SafeTexting R," Nerdworld, LLC, URL: https://itunes.apple.com/us/app/safetexting-r/id542190059?mt=8, Oct. 1, 2010, 2 pages.
"Safe Texting Campaign," URL: http://safetextingcampaign.com, Oct. 1, 2010, 2 pages.
"Drive Safe Mode," URL: http://www.drivesafemode.com/, Jan. 17, 2012, 1 page.
"Drive Safe Mode—Features," URL: http://www.drivesafemode.com/pages/features/, Jan. 17, 2012, 1 page.

* cited by examiner

DEVICE AND METHOD FOR DISABLING COMMUNICATION AND/OR OTHER APPLICATION FUNCTIONS ON A MOBILE COMMUNICATION DEVICE

RELATED APPLICATIONS

This application claims the benefit of priority to U.S. Provisional Application No. 61/824,957, filed May 17, 2013, and entitled "Method for Motion Isolation Technology (MIT) Using Non-GPS and Intelligent GPS Consumption and for Promoting Desired Behavior Change through Notification, Control and Rewards", incorporated by reference herein for all purposes.

This application is related to U.S. patent application Ser. No. 14/166,418, filed concurrently herewith, entitled "DEVICE AND METHOD FOR DISABLING COMMUNICATION AND/OR OTHER APPLICATION FUNCTIONS ON A MOBILE COMMUNICATION DEVICE," which is incorporated herein by reference in its entirety for all purposes.

BACKGROUND

1. Field of the Invention

This invention relates to disabling communication and/or other application functionality on a mobile communication device, and more particularly, to the disabling of the mobile communication functions and/or applications on the mobile communication device when motion patterns, as measured by an onboard accelerometer, indicates that the device is in a vehicle that is in motion.

2. Description of Related Art

With the proliferation of mobile communication devices such as wireless telephones, smart phones, tablets and wearable Internet-connected computing devices, such as smartwatches and/or glasses (e.g., Google glasses), more and more people or using such devices to communicate while on the go. For example, many automobile drivers will often engage in telephone conversations while driving. The danger of engaging in such behavior, particularly if a headset or other "hands-free" device is not used, is well documented. Even worse, many drivers engage in texting while driving. Drivers who engage in testing are at a significantly increased risk of causing an accident, often resulting in death or serious injury to themselves and others.

Due to the high risk and serious need to prevent drivers from using mobile communication devices, a number of products and services are now available to lock or disable certain communication features on their mobile communication devices while driving. These products and services typically rely on GPS to determine if a driver's automobile is in motion, and if so, are activated to prevent the driver from texting, engaging in a telephone conversation unless a hands-free device is used, or sending/reviewing entails. Such products include AT&T DriveMode, Sprint DriveFirst and Safely Go for example.

One problem with the above-described products and services is that they often rely on GPS, which typically consumes battery power at a significant rate. As a result, many of these products and services can be used only for a relatively short period of time before a battery recharge is needed, which may not be possible in an automobile if a charger is not readily available. In addition, not all mobile communication devices have built in GPS functionality. Also GPS will not work in locations where a GPS signal is not available or with users that do have data subscriber plans including GPS capabilities.

Another problem with the above-described products and services is that they provide very little in the way of incentives to encourage usage. In other words, they provide no rewards to incentives users, particularly teens or other youthful drivers, from taking advantage of the safety benefits of these products and services.

SUMMARY OF THE INVENTION

The above-described problems are solved by an application, designed to run on a mobile communication device and that is configured to disable certain communication functions and applications when motion patterns indicate that the device is in a vehicle that is in motion. When executed on the communication device, the application is configured to (i) receive one or more sample signals, which are indicative of ambient motion of the mobile communication device in the vehicle, from an accelerometer (ii) ascertain when the mobile communication device is in an undesirable motion state from the patterns of ambient motion, and (iii) disable one or more communication functions and/or applications when the mobile communication device is in the undesirable motion state. By using the accelerometer to generate the one or more sample signals, patterns of motion of the mobile communication device relative to the vehicle can be ascertained. When the motion patterns indicate that the vehicle is in motion, then the one or more communication functions and/or applications are disabled. In an alternative embodiment, the application may also rely on other signal generating devices, such as GPS and/or a vehicle speed signal received from an onboard diagnostic (OBD) system on the vehicle, in cooperation with the one or more signals received from the accelerometer.

In yet another embodiment, the application can be configured to automatically playing audio content on the mobile communication device when the one or more communication and/or other application functions are disabled or otherwise being discouraged. For example, with certain mobile devices, it may not be possible to disable certain functions. Consequently, music or other audio content can be played as a "Positive" distraction during times when the mobile communication device is in the undesirable motion state. With this embodiment, the audio content may include, but is not limited to, music from an online music provider, music stored on the communication device, YouTube media content, a talk radio broadcast, an audio book, or any other audio content.

BRIEF DESCRIPTION OF THE DRAWINGS

The invention may best be understood by reference to the following description taken in conjunction with the accompanying drawings, which illustrate specific embodiments of the invention.

It should be noted that like reference numbers refer to like elements in the figures.

The above-listed figures are illustrative and are provided as merely examples of embodiments for implementing the various principles and features of the present invention. It should be understood that the features and principles of the present invention may be implemented in a variety of other embodiments and the specific embodiments as illustrated in the Figures should in no way be construed as limiting the scope of the invention.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

Figure 1:
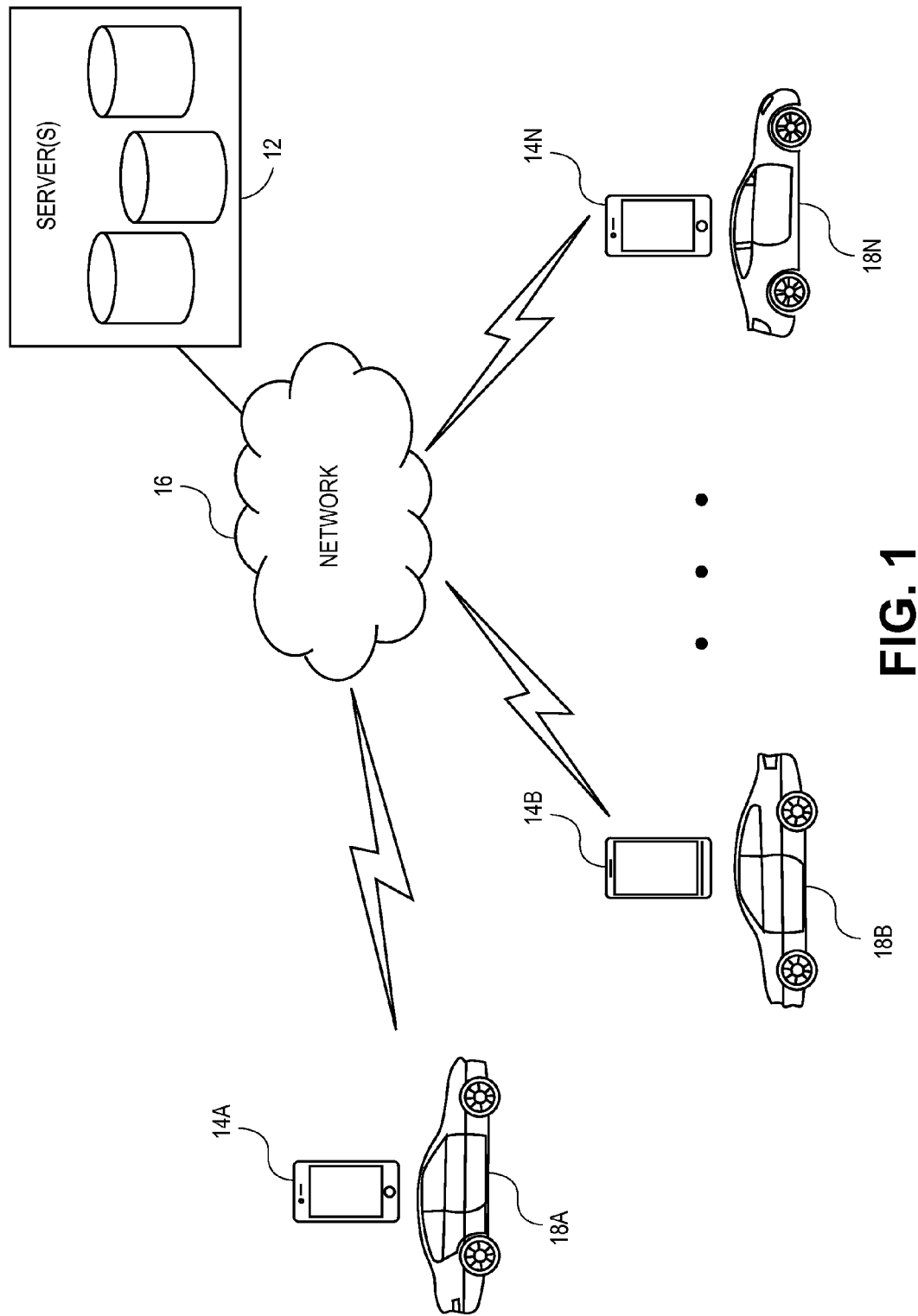
FIG. 1 is a diagram of a non-exclusive embodiment of a system for disabling communication and/or other application functions on mobile communication devices in accordance with the principles of the present invention.

Referring to FIG. 1, a diagram of a non-exclusive embodiment of a system for selectively disabling communication and/or other application functions on mobile communication devices is illustrated. The system 10 includes one or more servers 12 that are in wireless communication with a plurality of mobile communication devices 14A through 14N via a network 16. In various non-exclusive embodiments, the mobile communication devices 14 are smart phones, tablets, or wearable computing devices, such as smart-watches and/or glasses (e.g., Google glasses). The mobile communication devices 14 communicate with the servers 12 over the network 16 via a cellular and/or data links, as is well known in the art. As depicted in the figure, users of the mobile communication devices have their devices 14A-14N in their possession while driving in vehicles 18A-18N respectively.

Figure 2:
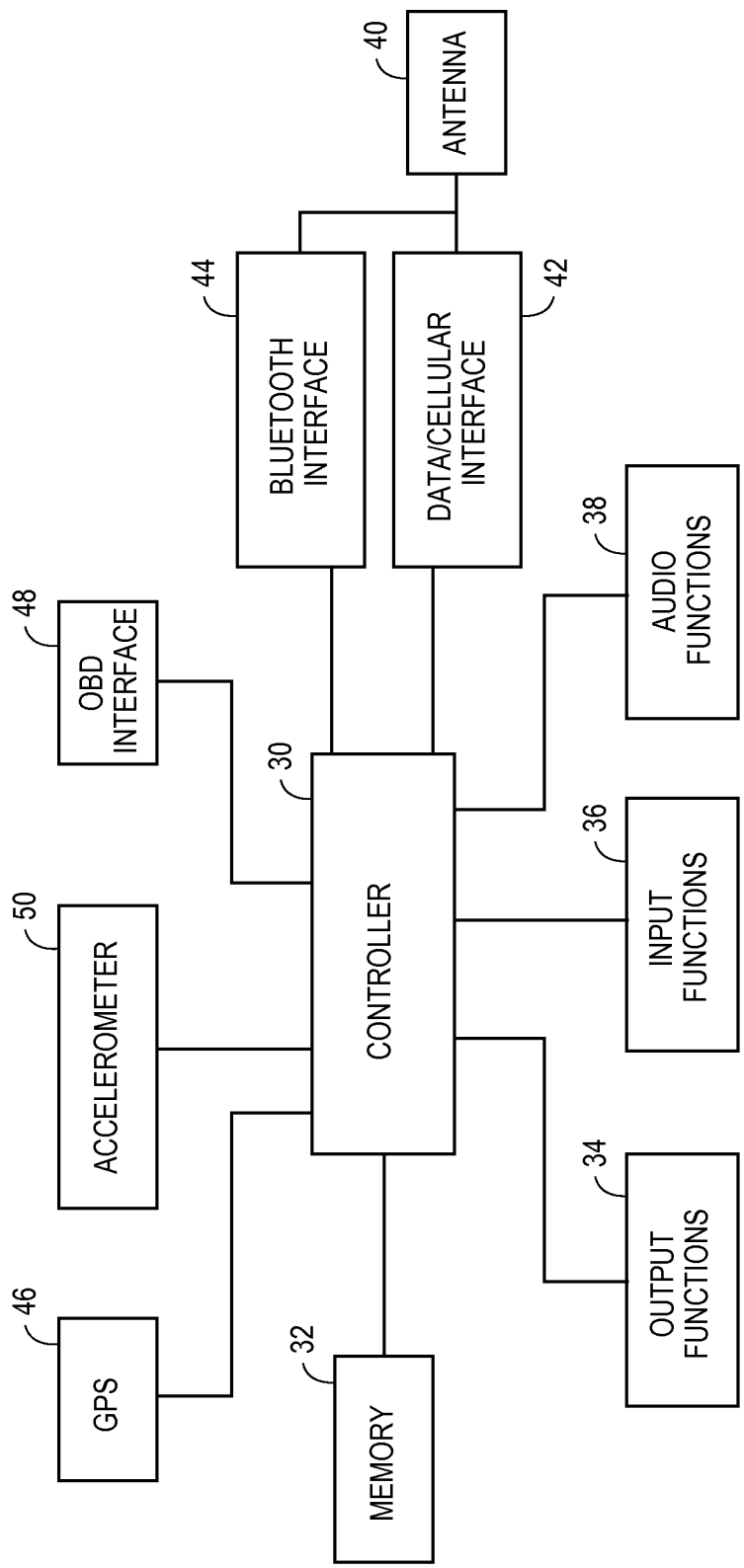
FIG. 2 is a block diagram of a non-exclusive embodiment of a mobile communication device in accordance with the principles of the present invention.

Referring to FIG. 2, a block diagram of a non-exclusive embodiment of an exemplary mobile communication device 14 in accordance with the principles of the present invention is shown. The device 14 includes a controller 30, such as a microprocessor, memory 32 such as RAM, ROM, or other forms of persistent and/or non-persistent storage, output functions 34 such as a touch-sensitive or a non-touch-sensitive display, input functions 36 such as a virtual or actual keyboard, on/off switches, volume control buttons, vibration control buttons, etc., audio related functions 38 such as one or more speakers, microphones audio alert generators, etc., a bi-directional antenna 40, coupled to a data/cellular interface 42 and a Bluetooth interface 44, a GPS device 46, an interface 48 for coupling the controller 30 to an Onboard Diagnostic System (OBD) on a vehicle 18, and an accelerometer 50. As the operation of each of the elements 30 through 50 are well known, a detailed explanation is not provided herein.

When a user has their mobile communication device 14 in a vehicle 18, it is typically in their pocket or purse, or placed within a designated location, such as a dashboard console. As such, the mobile communication device 14 is subject to "ambient" motion when the vehicle 18 is driving. By ambient motion, the Applicants intend to mean the movement of the mobile communication device 14 in the X, Y and/or Z directions relative to the vehicle 18 as it idles, accelerates, brakes, sways when turning, travels over bumps, potholes, and other surface imperfections, and other motions of the vehicle 18 while driving.

In accordance with the present invention, the controller 30 in devices 14 are configured to execute an application, which includes computer code embedded in a computer readable medium such as memory 32, that is configured to disable certain communication functions and/or applications when ambient motion patterns of the device 14 indicate that the device 14 is in a vehicle 18 that is moving. When executed, the application is configured to:

(i) receive one or more sample signals from the accelerometer 50, which are indicative of the ambient motion of the mobile communication device 14 in the vehicle 18;

(ii) ascertain when the mobile communication device 14 is in an undesirable motion state based patterns of ambient motion indicative of when the vehicle 18 is in motion; and (iii) disable one or more communication functions and/or applications when the mobile communication device 14 is in the undesirable motion state.

The application thus determines patterns of ambient motion of the device 14 relative to the vehicle 18 from the one or more sample signals generated by the accelerometer 50. When the motion patterns indicate that the vehicle 18 is in motion (e.g., driving), then the one or more communication functions and/or applications are disabled. In one embodiment, the application relies exclusively on the one or more signals generated by the accelerometer 50. In alternative embodiments, the application may also use other signal generating devices, such as GPS device 46 and/or a vehicle speed signal received via interface 48 from the OBD on the vehicle in cooperation with the one or more signals received from the accelerometer 50.

During operation of the application, the accelerometer 50 periodically measures and samples the ambient X, Y and Z motion of the mobile communication device 14 as the vehicle 18 is driving. From these samples, the application is able to determine if the vehicle is in an undesirable motion state (e.g., driving) or an acceptable motion state (i.e., not driving) in accordance with the algorithm described below.

Figure 3:
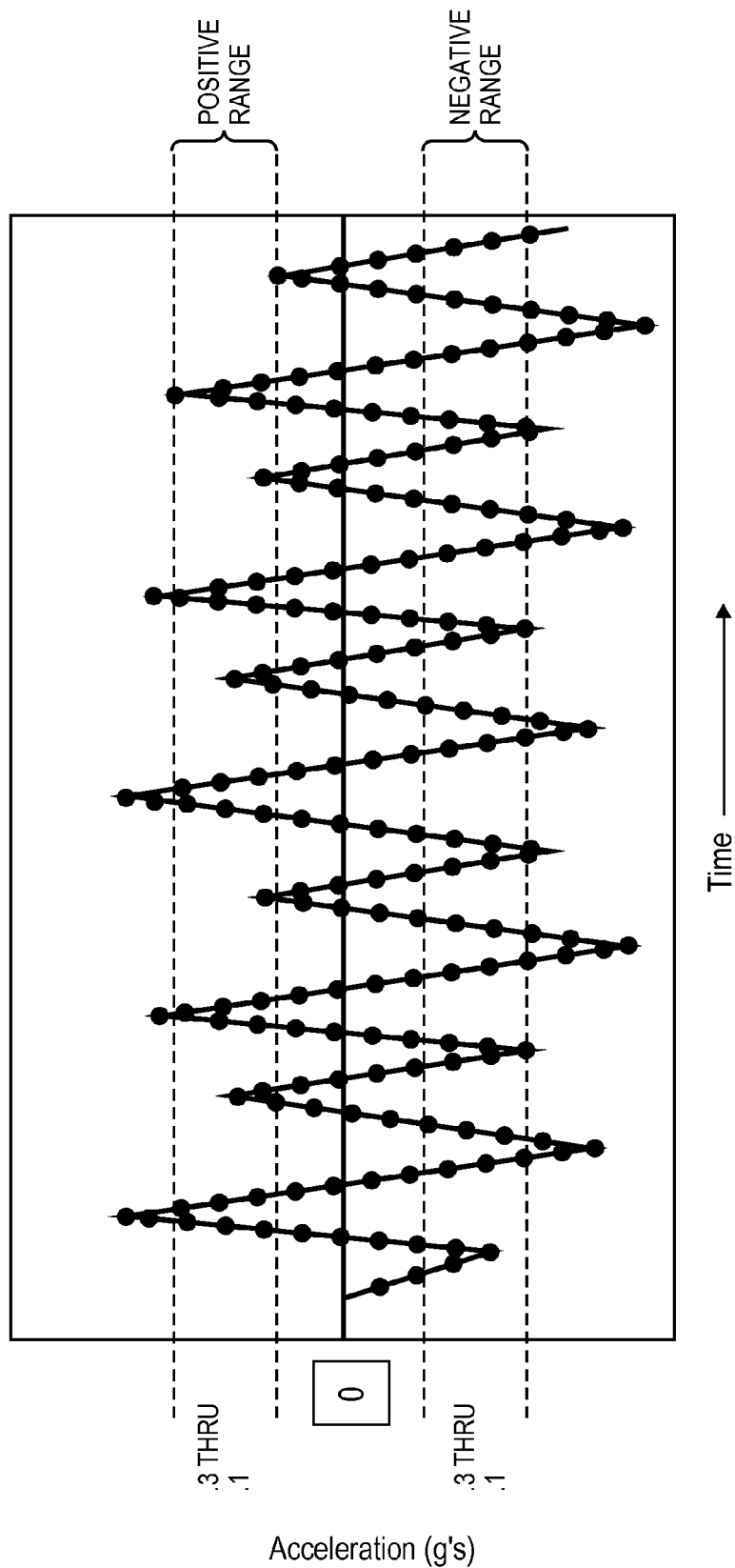
FIG. 3 is a diagram for ascertaining if a mobile communication device is in a undesirable or a desirable motion state in accordance with the principles of the present invention.

Referring to FIG. 3, a diagram for ascertaining if mobile communication device 14 is in an undesirable or acceptable motion state is shown. In this diagram, a plot of a number of signal samples from the accelerometer 50 is provided over a predetermined period of time along the X axis. The magnitude of the measured g-force of each signal sample is provided along the Y axis.

A g-force magnitude of 0.0 indicates that the communication device 14 is at rest. A certain percentage of g-force readings in a positive range of (0.1 through 0.3 g's) and a negative range of (−0.1 through −0.3 g's) in this example indicate typical readings of the accelerometer 50 while a vehicle 18 is driving (i.e., the ambient motion of the device 14 relative to the vehicle 18 while in motion). G-force readings having magnitude greater than the positive and negative range (+/−0.1 to +/−0.3) are indicative of acceleration of the mobile communication device 14 beyond what is normally expected to be measured while driving for a particular vehicle 18. For example, a mobile 14 phone will typically be subject to g-forces greater than 0.3 when moved from a pocket or purse to a user's ear when answering an incoming telephone call or when the device 14 is in a user's pocket or purse while walking. Accordingly, such readings are typically not used in determining if the mobile communication device 14 is in an acceptable or non-desirable motion state.

In accordance with a non-exclusive embodiment, the algorithm used by the application is configured to ascertain the number of signal samples having a magnitude within the positive and negative ranges (+/−0.1 to 0.3) over a predetermined period of time. Thereafter, the application determines if the mobile communication device 14 is in the undesirable motion state (i.e., the vehicle 18 is driving) or an acceptable motion state based on the ascertained number of signal samples within the positive and negative ranges during the predetermined period of time.

For example, if 22 of 100 positive g-force signal samples are in the positive range and 24 of 100 negative g-force signal samples are in the negative range, then a total of 23% of the 200 total readings fall in either of the two ranges. Based on this percentage, the application can make a determination if the device 14 is in the undesirable or an acceptable motion state. In general, an approximate percentage range of 18% to 25% of total sample points in either the positive or negative ranges over a predetermined period of time is indicative that the device 14 is in a vehicle 18 that is in motion.

In a non-exclusive embodiment, the application (i) continually receives the sampling signals at the periodic sampling interval from the accelerometer 50 and (ii) continually determines if the mobile communication device 14 is in the undesirable motion state or an acceptable motion state. In this manner, the application continually and automatically either disables or enables certain communication functions and/or applications, depending on the motion state of the device 14. In alternative embodiments, the application can be selectively activated so that it is not continually receiving sample signals and determining if the device 14 is in the undesirable or acceptable motion states.

It should be understood that for the sake of simplicity, the diagram of FIG. 3 plots acceleration of the device 14 only in a single direction (either X, Y or Z). In actual implementations, however, the acceleration readings in any or all of the X, Y and Z directions may be used. In general, g-reading in multiple directions provides more accuracy. In such embodiments the number of signal readings in the positive and negative ranges in each of the multiple directions may be combined together in determining if the device 14 is in an undesirable or an acceptable motion state.

As a practical matter, a number of factors impact the sample readings of the accelerometer 50. A non-exhaustive list of these factors may include (i) the type of vehicle, (ii) the speed of the vehicle, and (iii) road conditions. For example, a luxury car, such as a Lexus, driving on a freshly paved road will have different accelerometer 50 readings compared to an SUV traveling off road or a pick-up truck on a back country road. In order to take these factors into account, some embodiments of the application may include a "learning mode", which calibrates for the above factors in order to improve accuracy.

With embodiments including the learning mode, the application generates a calibration 'set' of signal readings from the accelerometer 50 by first collecting a series of readings, which when repeated over time, are used to 'predict' accurately that the device 14 is in motion for that 'set'. Each time the device 14 goes from a recognized 'resting' state (many zero or close to zero g readings) to one of possible driving, the application reads a collection of readings over time (again, for example, 5 seconds) and does this multiple times (i.e. after the first set is recognized, test again 30 seconds) in order to prove it is a 'reproducible' event. From the 'reproducible' events consisting of 'samples of readings' a determination of upper and lower settings is made based on a percentage of positive readings within the range for the repeatable set. For example in the scenario described above if a repeatable 23% of the readings within the positive range of (0.1 through 0.3 g's) was found during multiple tests, this would result in the definition of a learned "set1", in which upper and lower settings are defined as 0.1 and 0.3 g's, which may be typical for a Lexus. In another vehicle a repeatable and learned 'set2' may be the result of 25% a positive readings within a range of (0.3 through 0.5 g's), which may be typical for a Ford pickup truck. Hence a device 14 may end up with multiple different repeatable "learned" sets for different vehicles. When the device 14 is used in one of these vehicles, a valid set is identified based on initial readings and for a given drive the upper and lower settings of the set are used as the boundaries when evaluating for either the undesirable or acceptable motion state.

Figure 4:
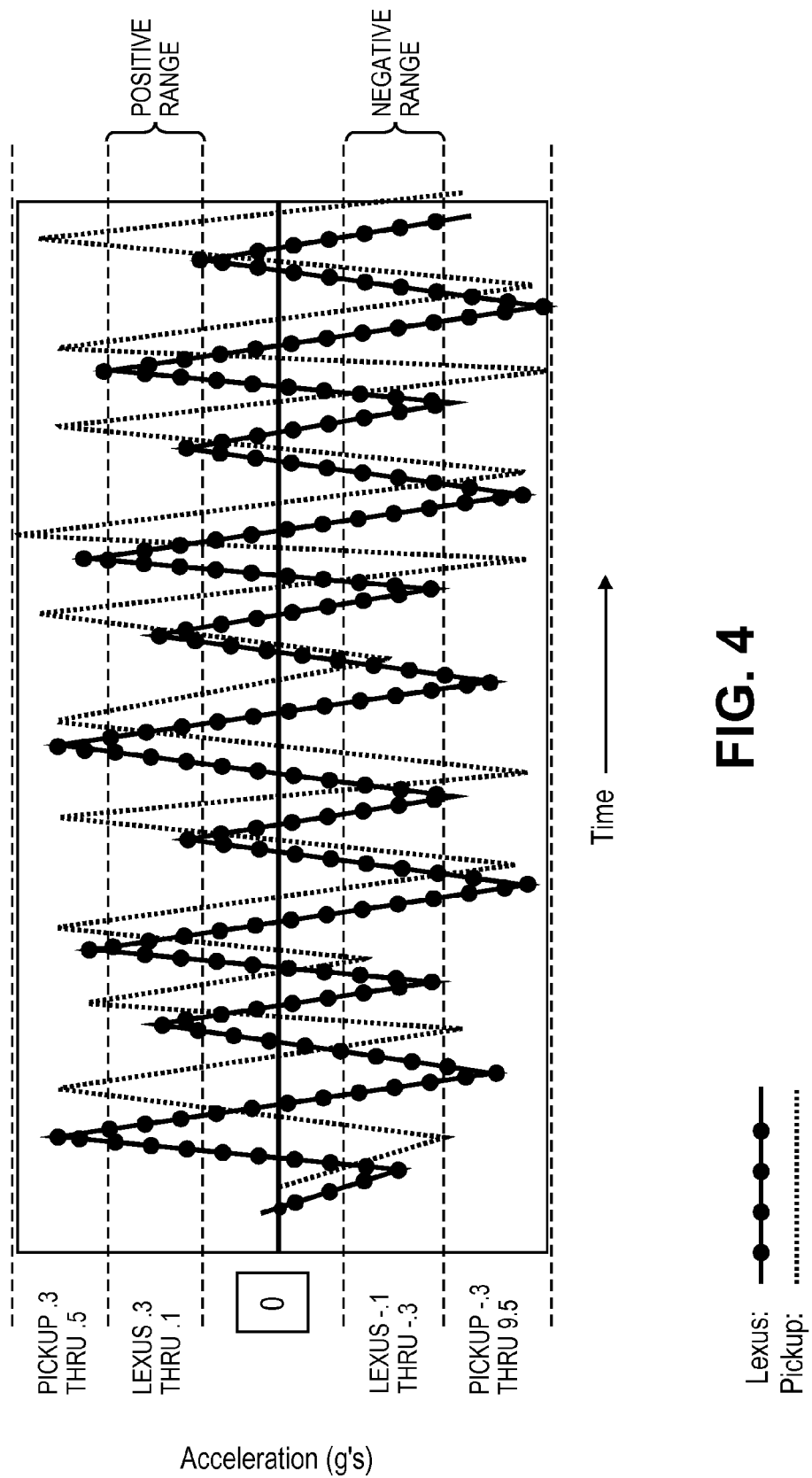
FIG. 4 is a diagram illustrating a "learning" function used in non-exclusive embodiments of the method of the present invention.

Referring to FIG. 4, a diagram illustrating a "learning" function for improving the accuracy of the application in determining if the device 14 is in the undesirable or desirable motion state. FIG. 4 illustrates two examples of the learning mode for two different vehicles 18, a Lexus and a pickup truck.

EXAMPLE 1

Lexus

From the prior example, we find 23% of the readings are found between (0.1 to 0.3) g's and (−0.01 to −0.3) g's when the vehicle is driving in the 20 to 40 mph range. By testing and finding this "range" to be true, the thresholds for the vehicle are "learned" and set to (0.1 to 0.3) (and −0.1 to −0.3 implied). The application then reruns this test again multiple times. If the same or similar range of (0.1 to 0.3) is consistently produced at or near the 23% positive readings, then there is a high likelihood of a "positive" for driving (i.e., the undesirable motion state) and the (0.1 to 0.3) range becomes the "calibration" for the device for Set1. If under different circumstances (i.e. driving 40-70 mph) shows a range of 25% is found between (0.2 to 0.4) g's, then the resulting Set2 is defined. This process is repeated multiple times so that multiple Sets, each indicative of the vehicle 18 in the undesirable motion state, are defined.

EXAMPLE 2

Pickup

In the pickup it may be found 25% of the readings is found between (0.3 to 0.5) and (−0.3 to −0.5). Similarly to example above, by testing and recognizing this "range" to be true, the thresholds for the vehicle and common speed are "learned" and set to (0.3 to 0.5) and (−0.3 to −0.5). The application then reruns this test again multiple times to determine if this range is consistently reproducible. If so, then Set3 for this vehicle is created and remembered. Again, this process is repeated multiple times so that multiple Sets for this vehicle are created.

Figure 5:
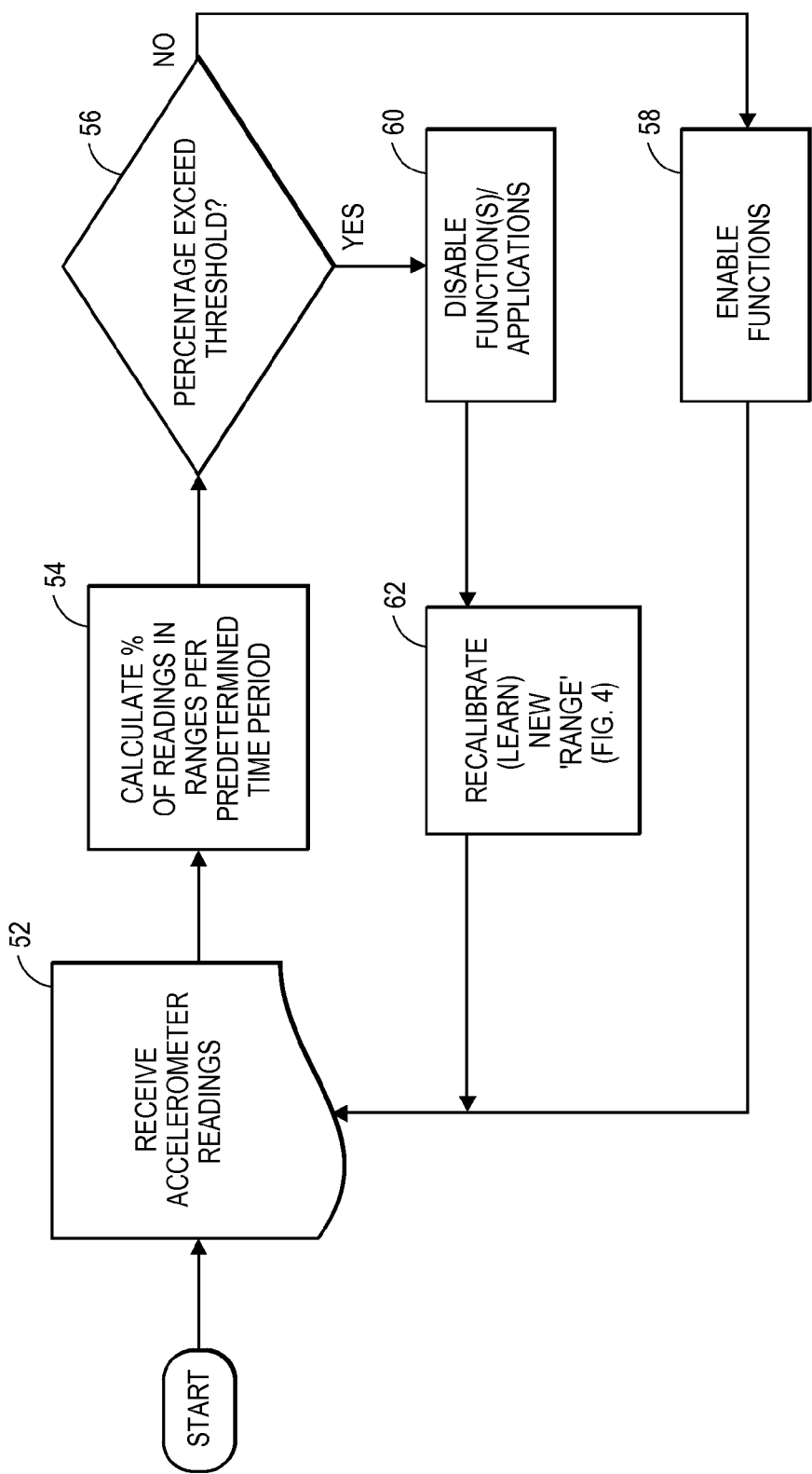
FIG. 5 is a flow diagram illustrating a non-exclusive method for disabling communication and/or other application functions on mobile communication devices in accordance with principles of the present invention.

Referring to FIG. 5, a flow diagram 50 illustrating the operation of the application in accordance with the present invention is shown. In the initial step 52, the application receives signal samples from the accelerometer 50 in the X, Y and/or Z directions. In the next step 54, the percentage of signal samples in the positive and negative ranges is calculated relative to the total number of samples per the predetermined period of time. In decision 56, it is determined if the percentage is greater or less than a threshold. If less than the threshold, then the application determines that the device 14 is in an acceptable motion state (i.e., not driving). As a result, the communication and/or other application functions on the device are enabled (step 58). On the other hand when the percentage exceeds the threshold, then the application ascertains that the device 14 is in a moving vehicle (i.e., an undesirable motion state). Consequently, one or more communication and/or other application functions on the device 14 are disabled (step 60). In addition, the learning function, as described with respect to FIG. 4, may optionally be applied (step 62). The above process is continually repeated, at least while the device 14 is present within vehicle 18. As a result, the application is capable of continually ascertaining if communication and/or other application functions should be enabled or disabled based on patterns of ambient motion of the device 14 over time.

Figure 6:
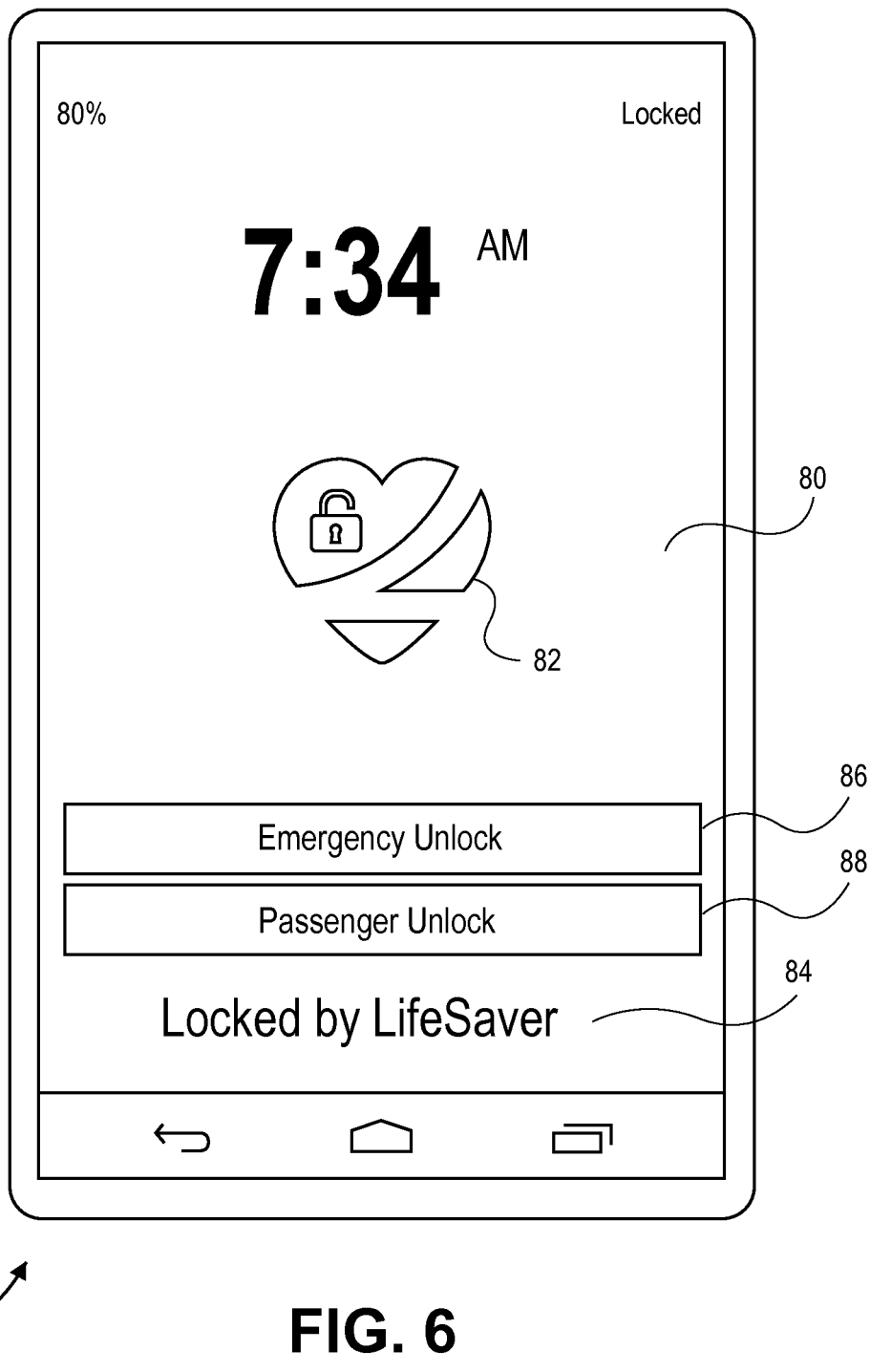
FIG. 6 is an exemplary screen shot of a mobile communication device with certain communication and/or other application functionality disabled in accordance with the principles of the present invention.

Referring to FIG. 6, an exemplary screen shot 80 of a mobile communication device 14 with communication and/or other application functionality disabled is illustrated. In the embodiment shown, several visual indicators 82 and 84 are displayed indicating that one or more communication and/or other application functions are disabled because the device 14 is in an undesirable motion state. In this example, the visual indicator 82 is a logo showing a seatbelt over a heart. The visual indicator 84 is a message appearing on the display of device 14 reading "Locked by LifeSaver". It should be understood that the indicators 82 and 84 are merely illustrative and that any type of visual and/or audio indicator may be used.

In yet another embodiment, the application further provides an override function for overriding the disabling of the one or more communication and/or other application functions on the mobile communication device 14, even when in the undesirable motion state. For example, the override function may be implemented in one or more of the following situations (i) when a user of the mobile communication device is a passenger in a vehicle and not the operator of the vehicle, (ii) in an emergency; (iii) when dialing an emergency telephone number or sending an emergency message; or (iv) any combination of (i) through (iii). As illustrated in FIG. 6, icons 86 and 88 appearing on the display of device 14 are illustrated for an "Emergency Unlock" and "Passenger Unlock" respectively. In a non-exclusive embodiment, a passkey or other code may be required to unlock and implement either override function.

In addition, the application may be further configured to generate a notification when an attempt is made to override the application from disabling the one or more communication and/or other application functions on the mobile communication device 14. In variations of this embodiment, the notification may be a message that is automatically sent to one or more designated persons (e.g., a parent or guardian) or entities located on a communication network, such as the server(s) 12. The message may be an email, text, SMS, a voice message, or any other communication that informs that designated person or entity that an attempt to override the communication disablement functionality has been made.

In accordance with various embodiments, the application is configured to disable one or more of the following communication and/or other application functions when the mobile communication device 14 is in the undesirable motion state: (i) a screen display, (ii) a virtual or actual keyboard, (iii) audio notifications, (iv) visual notifications, or (v) any combination of (i) through (iv). In yet other embodiments, some communication and/or other application functions may selectively not be disabled, even when the device 14 is in the undesirable motion state, such as for example inbound telephone calls, GPS functionality, maps or other navigational functionality, or any combination of (i) through (iii). In addition, the application may also disable certain communication applications on the device 14, such as email, texting, or other messaging applications. It should be noted that listed functions that are either enabled or disabled are merely illustrative examples. In actual implementations, any of the functions listed above, as well as others not listed, may be selectively either enabled or disabled.

In yet another embodiments, the application can rely exclusively on the signal samples generated by the accelerometer 50 in determining the motion state of the device 14 or, alternatively, may also rely a vehicle speed signal received via the interface 48 from an OBD system on the vehicle 18. In this latter example, the application uses the vehicle speed, in cooperation with the signal samples generated by the accelerometer 50, to determine if the vehicle 18 is in the undesirable or acceptable motion states.

In yet another embodiment, the application can rely exclusively on the signal samples generated by the accelerometer 50 in determining the motion state of the device 14, or alternatively, may also rely on a GPS signal generated by the GPS functionality 46. In this latter example, the application uses the GPS signal, in cooperation with the signal samples generated by the accelerometer 50, to determine if the vehicle 18 is in the undesirable or acceptable motion states. In yet further variations of this embodiment, the GPS functionality can be selectively turned on and/or off. For example, the GPS functionality can be turned on, resulting in the generation of a GPS signal, in situations such as when (i) the one or more sample signals received from the accelerometer 50 are indicative that the mobile communication device 14 is contained within a vehicle 18, (ii) automatically at a pre-designated time, (iii) in response to an input command to activate the GPS source 46, or (iii) any combination of (i) through (iii).

In yet another embodiment, the application is configured to measure an accumulated "safety" usage time that measures the accumulated time the application has been used. With this embodiment, a message including the accumulated time is periodically sent to a remote party and/or the server(s) 12. With this information, it is possible for users of the communication devices 14 to participate in and qualify for an award in an incentive or awards program. For example, an insurance company may grant users, such as teens, with some type of an award for safe driving. Alternatively, the insurance company may also wish to raise insurance rates in situations of unsafe driving or when unwarranted attempts are made to override the safety features of the application, as described above.

Figure 7:
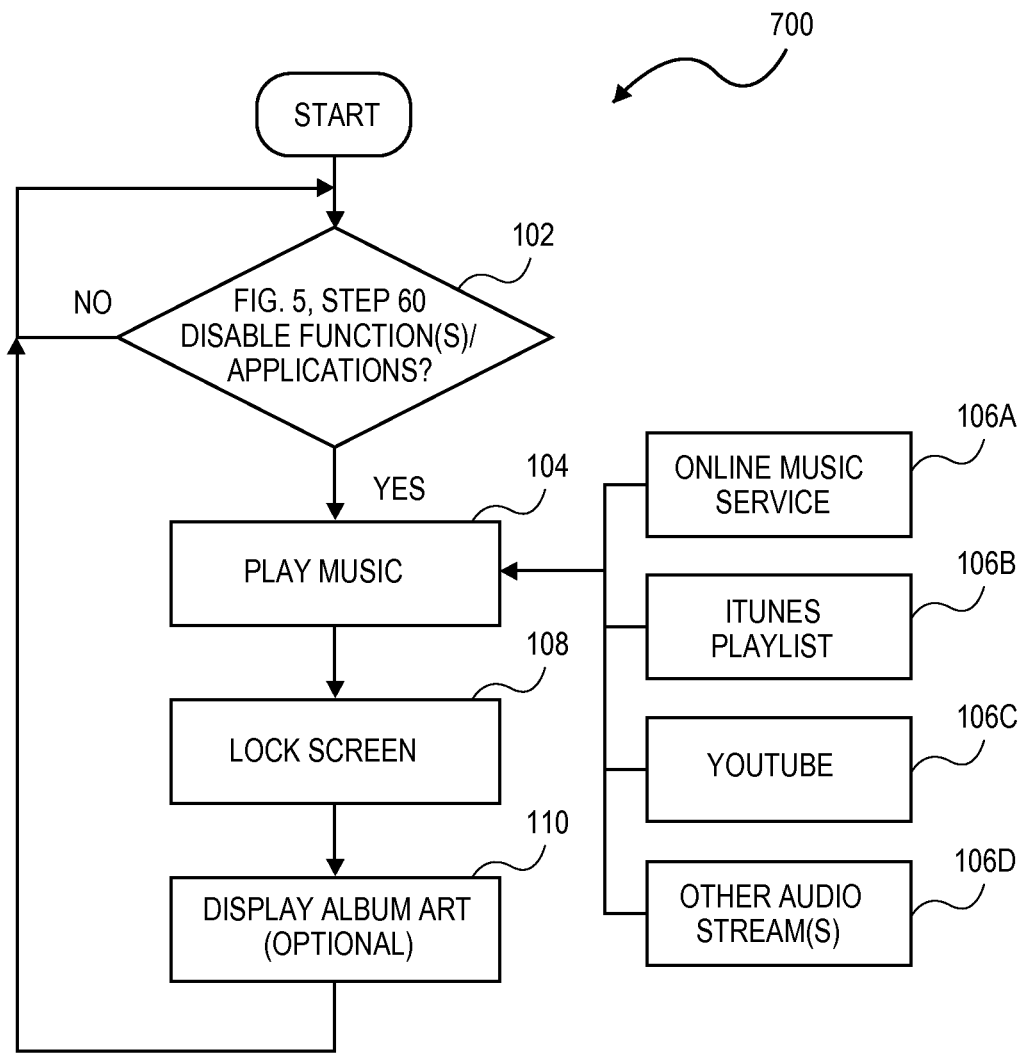
FIG. 7 is a flow diagram illustrating another non-exclusive method for disabling communication and/or other application functions on mobile communication devices in accordance with the principles of the present invention.

Referring to FIG. 7, a flowchart 100 illustrating the steps of using music to deter drivers from using their device 14 is illustrated. In this embodiment, the above-described process of FIG. 5 is continually performed in decision 102. When communication related function(s) and/or application(s) are disabled (step 60 in FIG. 5), the application automatically plays a music source (step 104). In various embodiments, the music or any other form of audio media may be played. For example, the media can be from an online music provider 106A (e.g., Pandora), from the user's iTunes music list 106B, YouTube 106C, or other audio media 106D, such as an audio book, talk radio streamed from a web site, or from a radio broadcast, or media created by the user or any other party. While the audio source is playing, the display screen of device 14 is presented music, or is locked (step 108), preventing the images may be optionally presented on the display of the communication device 14 (step 108). In alternative embodiments of FIG. 7, performing the FIG. 5 embodiment in decision 102 may be modified to rely on various input data in addition to or in place of the sample readings from the accelerometer 50 may be used. For example, GPS signals and/or signals from the OBD may also be used to determine if a device 14 is in a desirable or undesirable motion state.

The FIG. 7 embodiment offers the advantage of automatically playing music, or other audio media, which has been an acceptable form of entertainment for drivers for decades. In addition, since the audio media can be selected and/or defined by the user, it typically will keep the driver satisfied, meaning they are less likely to become distracted and try to use their communication device 14 while driving. In addition, this embodiment offers the following advantages and differs from using a typical music application on device 14 while driving in the following regards (i) it is automatic and contextual—music turns on immediately upon driving and turns off when you reach your destination which is based on a configured amount of time after driving has stopped; (ii) it is personalized—a user can set your playlists via YouTube so that it only plays music that the user wants; (iii) it is on demand the user has the ability to control the music player via voice commands (e.g., play "Bohemian Rhapsody"). Desired music or other audio content can be played when the user wants to play it; and (iv) it can be fun—interesting features such as location-based music, based on the driver's location, can be played. For example, the Song "Do You Know the Way to San Jose" can be played when crossing the boundary into city of San Jose.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. It is therefore intended that the invention be interpreted to include all variations and equivalents that fall within the true spirit and scope of the invention.

What is claimed is:

1. An application embedded in a non-transitory computer readable medium and intended for execution on a mobile communication device, the application configured to:
   receive a plurality of sample g-force signals from an accelerometer, the plurality of sample g-force signals indicative of ambient motion of the mobile communication device;
   generate an ambient motion pattern from the plurality of sample g-force signals, the ambient motion pattern indicative of the ambient motion of the mobile communication device;
   ascertain if the mobile communication device is in an undesirable motion state from the ambient motion pattern generated from the plurality of sample g-force signals received from the accelerometer, the undesirable motion state determined by a percentage of the plurality of sample g-force signals, over a predetermined period of time, falling within a g-force reading range that is indicative of the ambient motion of the mobile communication device in relation to a vehicle when traveling on a road surface; and
   prevent the use of one or more communication and/or other application functions on the mobile communication device when it is ascertained that the mobile communication device is in the undesirable motion state.

2. The application of claim 1, wherein the g-force reading range comprises:
   (a) a positive g-force reading range;
   (b) a negative g-force reading range;
   (c) both (a) and (b).

3. The application of claim 1, further comprising not preventing the use of the one or more communication and/or other application functions on the mobile communication device when it is ascertained that the mobile communication device is in an acceptable motion state.

4. The application of claim 1, wherein the plurality of sample g-force signals from the accelerometer are indicative of acceleration of the mobile communication device in the following directions:
   (i) X;
   (ii) Y;
   (iii) Z; or
   (iv) any combination of (i), (ii) or (iii).

5. The application of claim 1, wherein the plurality of sample g-force signals from the accelerometer are continually generated at a periodic sampling interval when the application is executed on the mobile communication device.

6. The application of claim 1, wherein ascertaining if the mobile communication device is in the undesirable motion state or an acceptable motion state further comprises:
   (i) counting the plurality of sample g-force signals that are either inside or outside the g-force reading range during the predefined period of time; and
   (ii) determining if the mobile communication device is in the undesirable motion state or the acceptable motion state based on the percentage of the counted plurality of sample g-force signals that are either inside or outside of the g-force reading range during the predefined period of time.

7. The application of claim 6, further configured to perform (i) and (ii) when the application is executed on the mobile communication device.

8. The application of claim 7, further configured to switch between preventing or not preventing the use of the one or more communication functions and/or communication applications on the mobile communication device depending on if the mobile communication device is in the undesirable or the acceptable motion states while (i) and (ii) are continually performed.

9. The application of claim 1, further configured to learn if the vehicle is in the undesirable motion state when evaluating among multiple sets of remembered g-force signal samples that are measured over successive periods of time and that are within substantially similar g-force reading ranges.

10. The application of claim 1, further configured to:
   receive a vehicle speed signal via an interface between the mobile communication device and the vehicle; and
   determining from the plurality of sample g-force signals received from the accelerometer and the vehicle speed signal if the mobile communication device is in the undesirable motion state.

11. The application of claim 10, wherein the application receives the vehicle speed signal from an onboard diagnostic system on the vehicle.

12. The application of claim 1, further configured to:
receive a GPS signal from a GPS source; and
determining from both the plurality of sample g-force signals received from the accelerometer and the GPS signal if the mobile communication device is in the undesirable motion state.

13. The application of claim 12, further configured to selectively receive or not receive the GPS signal so that the GPS signal is selectively either used or not used in determining if the mobile communication device is in the undesirable motion state.

14. The application of claim 13, further configured to selectively turn on the GPS source in accordance with one or more of the following:
(i) when the plurality of sample g-force signals received from the accelerometer are indicative that the vehicle is driving on the road surface;
(ii) automatically at a pre-designated time;
(iii) in response to an input command to activate the GPS source; or
(iii) any combination of (i) and (iii).

15. The application of claim 1, wherein preventing the use of the one or more communication and/or other application functions on the mobile communication device further comprises disabling one or more of the following communication and/or other application functions:
(i) a screen display on the mobile communication device;
(ii) a keyboard on the mobile communication device;
(iii) audio notifications;
(iv) visual notifications;
(v) text application;
(vi) email;
(vii) messaging application; or
(vii) any combination of (i) through (vii).

16. The application of claim 1, wherein preventing the use of the one or more communication and/or other application functions further comprises not disabling one or more of the following:
(i) inbound telephone calls;
(ii) GPS functionality;
(iii) maps and/or navigation functionality; or
(iv) any combination of (i) through (iii).

17. The application of claim 1, further configured to provide an override function for overriding the prevention of using the one or more communication and/or other application functions on the mobile communication device.

18. The application of claim 17, wherein the override function is operable in one or more of the following situations:
(i) when a user of the mobile communication device is a passenger in the vehicle and not the operator of the vehicle;
(ii) in an emergency situation; or
(iv) any combination of (i) through (ii).

19. The application of claim 1, further configured to generate a notification when an attempt is made to override the application from preventing the use of the one or more communication and/or other application functions on the mobile communication device.

20. The application of claim 19, wherein the notification is a message automatically sent to one or more designated persons or entities located on a communication network.

21. The application of claim 20, wherein the message is one or more of the following:
(i) an email message;
(ii) a text message;
(iii) a voice message; and/or
(iv) an SMS message.

22. The application of claim 1, providing a parental/guardian control setting that enables a parent or guardian to control the operation of the application on the mobile communication device on behalf of a user of the mobile communication device.

23. The application of claim 22, wherein the control settings are accessed and controlled by a password application lock accessible by the parent or guardian.

24. The application of claim 22, wherein the control settings are configured to control one or more of the following functions on the mobile communication device:
(i) a predetermined time the mobile communication device may be used;
(ii) a time duration the mobile communication device can be used;
(iii) enable/an override feature;
(iv) set up a notification feature;
(v) create an incentive/rewards program; or
(vi) any combination of (i) through (v).

25. The application of claim 1, further configured to measure an accumulated safety usage time indicative of the accumulated time the application is executed on the mobile communication device.

26. The application of claim 25, further configured to generate a rewards message when the accumulated safety usage time exceeds a threshold, where in the rewards message enables a user of the mobile communication device to qualify for an award in an awards program.

27. The application of claim 1, wherein the mobile communication device configured to execute the application comprises one of the following:
(i) a mobile phone;
(ii) a "smart" phone;
(iii) a wireless phone or radio;
(iv) a tablet computer;
(v) a laptop computer;
(vi) a wearable computer;
(vii) a smartwatch; or
(viii) Internet-connected eye-glasses.

28. The application of claim 1, wherein the g-force reading range is one of the following:
(a) 0.1 to 0.3 g's;
(b) −0.1 to −0.3 g's; or
(c) both (a) and (b).

29. The application of claim 1, wherein the percentage of the plurality of sample g-force signals, over the predetermined period of time, falling within the g-force reading range that is indicative of motion of the mobile communication device in relation to a vehicle when traveling on a road surface ranges from 18 to 25 percent.

* * * * *